UNITED STATES PATENT OFFICE.

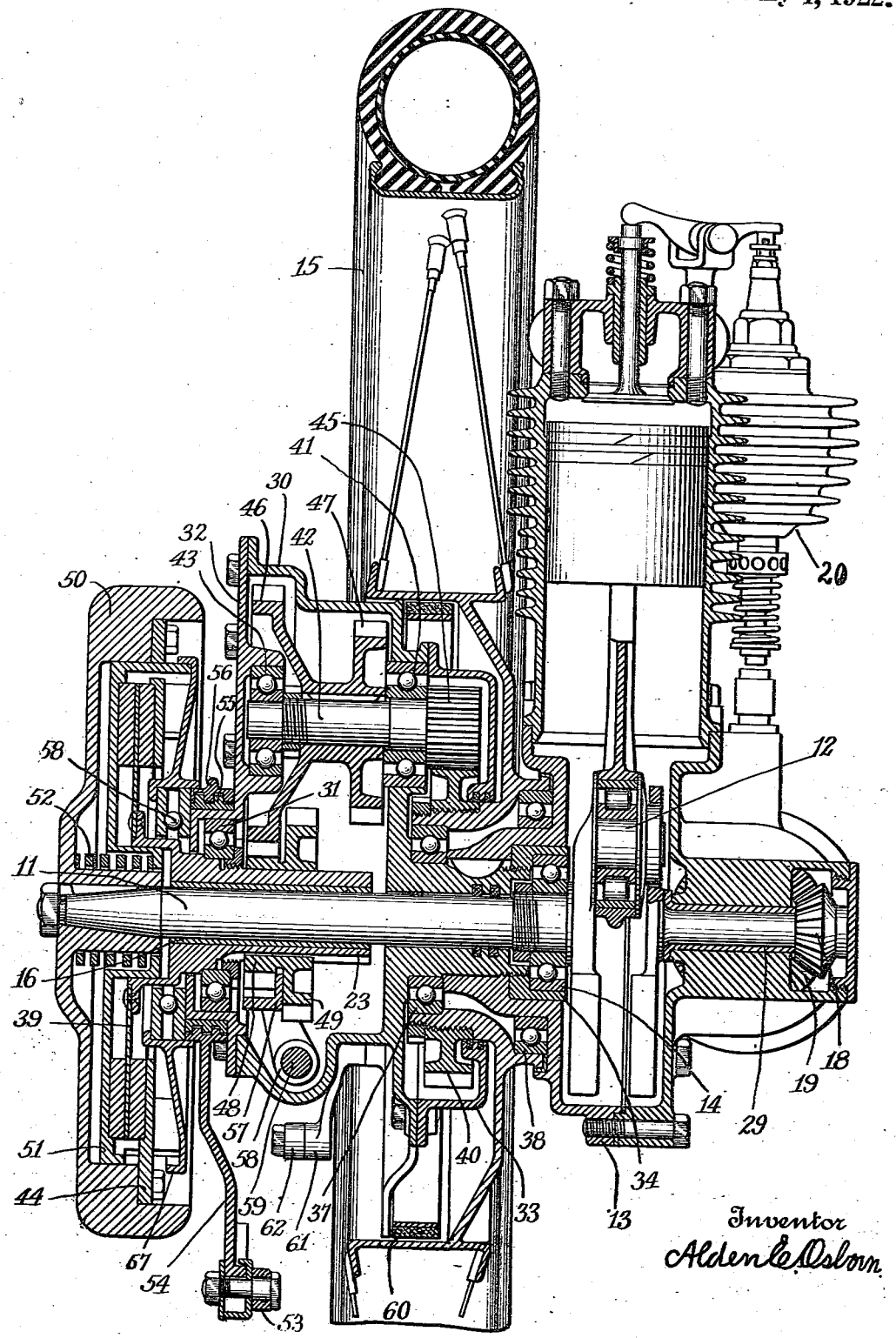

ALDEN E. OSBORN, OF NEW YORK, N. Y.

MOTOR VEHICLE.

1,421,545.  Specification of Letters Patent.  Patented July 4, 1922.

Application filed September 1, 1920. Serial No. 407,373.

*To all whom it may concern:*

Be it known that I, ALDEN E. OSBORN, a citizen of the United States of America, and a resident of New York, county of the Bronx, and State of New York, have invented certain new and useful Improvements in a Motor Vehicle, of which the following is a specification.

This invention relates particularly to a type of self propelled vehicle in which the main driving shaft of the propelling motor, or a shaft connected therewith, is concentric with the traction wheel and passes through the axle of said wheel which axle is connected to the vehicle framing at both sides of the wheel. It is therefore especially fitted for use in connection with motor cycles or tricycles having a single driving wheel either in the front or rear although it is not necessarily limited in its use to such types of vehicles. An important feature of the invention lies in the construction of the gearing employed to transmit the power of the motor from the aforesaid driving shaft to the traction wheel and the arrangement of the friction clutch, employed to connect or disconnect the shaft from the wheel, between the gearing and the shaft instead of as has hitherto been the case between the gearing and wheel thus enabling a smaller clutch to be used.

In the accompanying drawing I have, for the purposes of disclosure, illustrated my invention in one form only but I would have it understood that it is susceptible of embodiment in other forms without departure from the true spirit and scope of the invention as defined in the appended claims.

The accompanying drawing represents a sectional elevation of the traction wheel driving mechanism of my present invention taken parallel with the center of the wheel hub.

The power unit shown in the drawing comprises principally the internal combustion engine 20 at one side of the wheel, the transmission mechanism within the wheel hub and the clutch and fly wheel on the other side of the wheel from the engine. The engine 20 is shown in the illustrations as being of the single cylinder four cycle type although obviously a two cycle or a multi-cylinder engine may be used.

The crank shaft of the engine is shown as made in two parts one of which 11 carries the wrist pin 12 and is mounted in a bearing 14 in the crank case 13 and a bearing 16 in the sleeve 23 and the other of which is a sliding fit on the wrist pin 12 or a nut thereon and is mounted in a bearing 29 in the crank case 13 and serves simply to drive the bevel pinions 18 and 19 for the valve shaft drive or the operation of other devices which it is desired to connect to the engine. Should it be desired to make the crank shaft in one piece with both the bearings 14 and 29 arranged to support the crank pin it is obvious that there is not any reason why it cannot be done, although it is believed that the construction shown is cheaper. The sleeve 23, in which the shaft 11 turns is mounted in turn in a bearing 31 in the casing cover 32 which cover closes one side of the gear box 30—the other side being closed by the cover 33. The gear box 30 is attached to the crank case 13 at one side by having a projecting hub clamped into a hub on the crank case by the nut 34 and is attached to the frame of the vehicle at the other side and thus, as the crank case is also attached to the vehicle frame, practically forms the axle of the traction wheel 15 and serves as a connecting member between the frame forks at both sides thereof. The traction wheel is mounted on suitable bearings 37 and 38 and carries the driven gear 40 of the transmission which meshes with the pinion 45 on the shaft 42 mounted in bearings 41 and 43 in the gear box 30 and cover 32. This shaft also carries two different size gears 46 and 47 which are in turn arranged so that they can be driven by the gears 48 and 49 slidably mounted on the sleeve 23. The sleeve 23 is fastened to a clutch disc 39 adapted to be frictionally driven by clamping it between a friction surface on the disc 44 bolted to the flywheel 50 and a friction surface on the movable disc 51 which also is carried by the flywheel but arranged to slide therein and is normally pressed against the disc 39 by a spring 52. In order to release this clutch when desired an internally threaded collar 56 is provided which is fitted on an externally threaded sleeve 55 on the cover 32 so that by rotating this collar 56, which can be accomplished by moving the rod 53 pivoted on the lever 54, the thrust bearing 58 and plate 67 can be pressed against the movable disc 51 in opposition to the action of the spring 52 and separate that disc from the disc 44 thus freeing the disc 39, sleeve 23 and gears 48 and 49 from movement with the flywheel. It is obvious that the thread on the collar 56 and sleeve 55 should have a very quick pitch in fact several threads would preferably be used or if desired ratchet or cam teeth could be substituted for the threads. In order to provide for adjustment of the clutch the lever 54 is provided with a segment end (see Figure 1) along which the bolt on which the operating rod 53 is pivoted can be adjusted to bring the collar 56 into a position where it would disengage the clutch properly. While the clutch mechanism as thus described is very practical it is obvious that other forms of clutches may be used as the exact form of this clutch is not essential to the other parts of my invention. It will be observed that, when the parts are in the position shown in Figure 2 and the gears 46 and 48 in mesh, the traction wheel would be driven by the motor at a low speed while when the gears 48 and 49 are shifted, by means of the collar 57, lever 58 and operating rod 59, so that the gears 47 and 49 are in mesh the traction wheel would be driven by the motor at a higher speed. Should it be desired the shiftable gears may be the gears 46 and 47 on the side shaft 42 while the gears 48 and 49 may be rigidly attached to the sleeve 23. Other modifications may be made especially in the addition of extra gears to the side shaft and sleeve so that more speeds may be obtained. In order to provide for stopping the vehicle I have provided a brake band or shoes 60 that can be expanded against the interior of the hub of the wheel 15 by a lever 61 arranged to act on it in any suitable way and connected by means of the rod 62 to the brake operating device moved by the driver.

It should be clearly understood that while I have described and illustrated my invention in connection with an internal combustion engine only, it is in no way limited to use with that type of prime mover alone but may be used with any other type suitable modifications being made to meet the special requirements.

Having thus described my invention, I claim as new and desire to secure by Letters Patent—

1. In a motor vehicle the combination of a traction wheel, a hub for said wheel, a supporting member passing through said wheel hub and having a bearing for said hub, a main shaft passing through said bearing, a propelling motor connected to said main shaft at one side of said wheel, a secondary shaft substantially parallel with said main shaft, a gear on said secondary shaft, a gear on the wheel hub and intermeshing with the first named gear, and controllable means for rotating said secondary shaft from said main shaft or for allowing said main shaft to turn independently of said secondary shaft, said secondary shaft, said gearing and said controllable means being on the other side of the said wheel from the said motor connection to the main shaft.

2. In a motor vehicle the combination of a traction wheel, a hub for said wheel, a supporting member passing through said wheel hub and having a bearing for said hub, a main shaft passing through said bearing, a propelling motor connected to said main shaft at one side of said wheel, a secondary shaft substantially parallel with said main shaft, a gear on said secondary shaft, a gear on the wheel hub and intermeshing with the first named gear, and controllable means for rotating said secondary shaft from said main shaft at different speeds or for allowing said main shaft to turn independently of said secondary shaft, said secondary shaft, said gearing and said controllable means being on the other side of the said wheel from the said motor connection to the main shaft.

In witness whereof, I have hereunto set my hand this 30th day of August, 1920.

ALDEN E. OSBORN.